Patented Apr. 27, 1943

2,317,808

UNITED STATES PATENT OFFICE 2,317,808

PROCESS OF PREPARING PHENYL-
ACETYLENE

Wilhelm Sandhaas, Mannheim, Germany; vested
in the Alien Property Custodian

No Drawing. Application June 28, 1939, Serial
No. 281,693. In Germany July 2, 1938

5 Claims. (Cl. 202—57)

The present invention relates to a new process of preparing phenylacetylene.

It is known to purify acetylene prepared by thermal or electrical methods for example from gases containing hydrocarbons of the olefinic and paraffinic series, by removing the acetylene itself from other unsaturated hydrocarbons formed together with acetylene, such as allene and diacetylene. When washing the crude acetylene with organic liquids, as for example with oils or tars, the other hydrocarbons constituting the impurities are dissolved, whereas acetylene itself escapes. The separation of such dissolved impurities from the said solvents in order to reclaim the solvents for further use is preferably effected by applying reduced pressure to the solution, gassing out the solution or raising the temperature of the solution.

By working up in the said manner, however, the phenylacetylene, the presence of which in the electric arc acetylene is known, cannot be recovered from the washing liquids but it becomes enriched therein to an increasing extent with continued use. The fact that it is difficult to recover the phenylacetylene is probably due to the presence of diacetylene. Though this hydrocarbon boils at from 9.5 to 10° C. and by itself should be readily capable of being removed from the washing liquids, it is not possible to expel the diacetylene completely because it has a great tendency to polymerize. By applying suction and gassing the washing liquids, only the readily volatile monomeric diacetylene can, therefore, be removed, while a large part of the already polymerized, originally volatile, diacetylene remains therein and in some cases forms a jelly-like mass or a solid paste with the solvent. Since the polymerization of diacetylene is accelerated by increasing temperature, the phenylacetylene which boils at from 142° to 143° C. can only be separated very incompletely by simple heating; it is somehow retained by the diacetylene polymerization product. Thus for example from a washing oil containing, in addition to other unsaturated hydrocarbons, up to about 7.7 per cent of phenylacetylene, there is obtained by simple distillation only from 1 to 2 per cent of a distillate having a content of from 10 to 15 per cent of phenylacetylene, and from another washing oil containing 4.8 per cent of phenylacetylene there is obtained from about 4 to 5 per cent of distillate which contains about 24 per cent of phenylacetylene, the balance of phenylacetylene remaining in the liquid solvent.

I have found that far better yields of phenylacetylene are obtained from the organic liquids used for washing acetylene prepared by thermal or electrical methods by polymerizing at least part of the diacetylene, the remaining diacetylene being driven off from the said liquid, and subsequently subjecting the said liquid free from monomeric diacetylene to a distillation under reduced pressure, e. g. a vacuum distillation, for example at pressures below 600 millimeters (mercury gauge) advantageously below 50 millimeters, or to a steam distillation.

The diacetylene may be removed wholly by polmerization before the distillation under reduced pressure, for example by first keeping the washing liquid containing phenylacetylene and diacetylene at moderately elevated temperature, e. g. below 100° C., which is below the boiling point of phenylacetylene, until all the diacetylene is polymerized and then distilling under reduced pressure.

The diacetylene may also be removed partly by gassing out the monomeric diacetylene. For this purpose an inert gas, for example nitrogen, may be passed through the liquid at ordinary or moderately elevated temperature not substantially over 100° C. The remaining part of the liquid containing polymerized diacetylene is then distilled under reduced pressure.

The washing liquid containing phenylacetylene and diacetylene may also first be distilled under reduced pressure, for example with steam, whereby the greater part of the diacetylene is polymerized and retained. The distillate contains 75 per cent or more of the washing liquid, phenylacetylene and monomeric diacetylene. The latter compound may be removed by gassing out, and the liquid distilled again, preferably under reduced pressure. The diacetylene may also be separated by distilling the distillate obtained in the steam distillation under reduced pressure and collecting a fraction rich in phenylacetylene but free from diacetylene.

From the fractions rich in phenylacetylene but free from diacetylene obtained in accordance with my invention, the phenylacetylene may be obtained in a pure or almost pure form by further distillation which may be carried out at atmospheric pressure because there is no longer any diacetylene present.

Suitable organic liquids for washing impure acetylene obtained by thermal or electrical methods are those which dissolve the impurities without substantially dissolving actylene. There may be mentioned liquid hydrocarbons, such as the higher liquid members of the paraffinic and olefinic series of hydrocarbons, as for example synthetic oils and mobile tars, or mineral oils or fractions of these hydrocarbon products, as for example benzine or higher boiling oils, such as middle oils or heavy oil, or also benzene, or animal or vegetable oils. Furthermore the liquid halogen substitution products of hydrocarbons may be employed with good success as also nitrobenzene. It is of advantage to employ liquids having a relatively low vapor pressure. The boiling point of the liquid or its constituents should preferably be so different from that of phenylacetylene that from a mixture of part of the liquid and phenylacetylene the latter may be isolated by distillation.

The following examples will further illustrate how this invention may be carried out in practice but the invention is not restricted to these examples.

*Example 1*

100 kilograms of a gas oil having a phenylacetylene content of 4.8 per cent obtained by working according to the British patent specification No. 386,052 are kept at from 90° to 100° C. until a sample of the oil deposits a pure yellow precipitate (copper compound of phenylacetylene) from colorless cuprous salt solution (see Berichte der Deutschen Chemischen Gesellschaft, volume 32, page 2697). The oil thus pretreated is then distilled under reduced pressure. At a pressure of from 22 to 36 millimetres there are thus obtained 15.8 kilograms of a fraction boiling between 26° and 109° C. having a phenylacetylene content of 20.33 per cent, i. e. 67 per cent of the amount contained in the initial oil.

*Example 2*

Nitrogen is led at from 90° to 100° C. through 100 kilograms of a gas oil (specific gravity 0.9577 at 20° C.) used for washing electric arc acetylene, the phenylacetylene content of which is 7.7 per cent until a sample of the escaping gas deposits a pure yellow precipitate from a colorless cuprous salt solution (see above). 21.1 kilograms of oil are then distilled off under a pressure of from 8 to 9 millimeters, whereby a fraction boiling between 25° and 80° C. is obtained having a phenylacetylene content of 25.4 per cent, i. e. 69.6 per cent of the whole of the phenylacetylene. The 21.1 kilograms of oil yield by a single distillation under ordinary pressure 3 kilograms of practically pure phenylacetylene having a boiling range of 140 to 145° C.

*Example 3*

100 kilograms of the gas oil as used in Example 1 are distilled under reduced pressure. At a pressure of from 15.2 to 13.9 millimeters there pass over between 21° and 85.7° C. 15.65 kilograms of oil. Through this fraction there is led at from 90° to 100° C. a current of nitrogen until a sample of the waste gas precipitates a yellow deposit from colorless cuprous salt solution (see above). By the nitrogen there are expelled 1.6 kilograms of readily volatile constituents, chiefly monomeric diacetylene. The residual 14.05 kilograms of oil contain 32.15 per cent of phenylacetylene, i. e. 94 per cent of the amount contained in the original oil.

*Example 4*

100 kilograms of the gas oil used in Example 1 are first distilled with steam. Through the 75.6 kilograms of oil thus obtained there is led at from 90° to 100° C. a current of nitrogen until a sample of the waste gas deposits a pure yellow precipitate from colorless cuprous salt solution (see above). In this way the oil is diminished by 0.9 kilogram of low boiling constituents, mainly monomeric diacetylene. The remaining 74.7 kilograms of oil are distilled at a pressure of from 14 to 15.5 millimeters and the fraction boiling between 24.8° and 87° C. is collected. 14.4 kilograms of an oil are thus obtained having a phenylacetylene content of 26.53 per cent, i. e. 79.4 per cent of the amount contained in the initial oil.

If the 75.6 kilograms of distillate obtained by the steam distillation be distilled without further treatment under a pressure of 15 millimeters, there are obtained 13.6 kilograms of a fraction boiling between 29° and 93° C. having a phenylacetylene content of 25.24 per cent, i. e. 71.5 per cent of the amount contained in the initial oil.

What I claim is:

1. A process for the production of phenylacetylene from an organic liquid used for washing acetylene prepared by thermal or electrical treatment of gaseous hydrocarbons and which contains diacetylene which process comprises polymerizing in the liquid at least part of the diacetylene, driving off remaining monomeric diacetylene from the said liquid with an inert gas at a temperature below the boiling point of phenylacetylene, and subsequently subjecting the remaining liquid free from monomeric diacetylene to a distillation under reduced pressure while condensing a fraction rich in phenylacetylene.

2. A process for the production of phenylacetylene from an organic liquid used for washing acetylene prepared by thermal or electrical treatment of gaseous hydrocarbons and which contains diacetylene which process comprises heating the said liquid to a temperature below the boiling point of phenylacetylene until the diacetylene present is in a polymerized state, and subsequently subjecting the remaining liquid to a distillation under reduced pressure while condensing a fraction rich in phenylacetylene.

3. A process for the production of phenylacetylene from an organic liquid used for washing acetylene prepared by thermal or electrical treatment of gaseous hydrocarbons and which contains diacetylene which process comprises polymerizing part of the monomeric diacetylene in the said liquid while simultaneously driving off monomeric diacetylene with an inert gas at a temperature below the boiling point of phenylacetylene, and subsequently subjecting the remaining liquid to a distillation under reduced pressure while condensing a fraction rich in phenylacetylene.

4. A process for the production of phenylacetylene from an organic liquid used for washing acetylene prepared by thermal or electrical treatment of gaseous hydrocarbons and which contains diacetylene which process comprises distilling off under reduced pressure from the liquid a fraction consisting of part of said liquid, phenylacetylene and monomeric diacetylene, removing from the distillate monomeric diacetylene with an inert gas at a temperature below the boiling point of phenylacetylene and subsequently subjecting the remaining liquid to a distillation under reduced pressure while condensing a fraction rich in phenylacetylene.

5. A process for the production of phenylacetylene from an organic liquid used for washing acetylene prepared by thermal or electrical treatment of gaseous hydrocarbons and which contains diacetylene which process comprises subjecting the said liquid to a steam distillation while condensing a fraction consisting of part of said liquid, phenylacetylene and monomeric diacetylene, removing from the distillate monomeric diacetylene with an inert gas at a temperature below the boiling point of phenylacetylene and subsequently subjecting the remaining liquid to a distillation under reduced pressure while condensing a fraction rich in phenylacetylene.

WILHELM SANDHAAS.